United States Patent
Atkin et al.

(10) Patent No.: US 7,401,288 B2
(45) Date of Patent: Jul. 15, 2008

(54) METHOD AND APPARATUS FOR TRANSMITTING ACCESSIBILITY REQUIREMENTS TO A SERVER

(75) Inventors: Steven Edward Atkin, Austin, TX (US); Ronald B. Capelli, Round Rock, TX (US); Michael Aaron Kaply, Leander, TX (US)

(73) Assignee: International Business Machines Corporation, Armonk, NY (US)

(*) Notice: Subject to any disclaimer, the term of this patent is extended or adjusted under 35 U.S.C. 154(b) by 984 days.

(21) Appl. No.: 10/610,239

(22) Filed: Jun. 30, 2003

(65) Prior Publication Data
US 2004/0268360 A1 Dec. 30, 2004

(51) Int. Cl.
*G06F 17/00* (2006.01)
(52) U.S. Cl. .............. 715/234; 715/249; 709/203; 709/228
(58) Field of Classification Search ............ 715/501.1, 715/513, 523, 727, 205, 234, 249; 709/203, 709/224, 228
See application file for complete search history.

(56) References Cited

U.S. PATENT DOCUMENTS

| | | | | |
|---|---|---|---|---|
| 5,551,055 A | 8/1996 | Matheny et al. | ............ | 395/882 |
| 5,652,884 A | 7/1997 | Palevich | .............. | 395/651 |
| 5,687,366 A | 11/1997 | Harvey, III et al. | ........ | 395/610 |
| 5,732,218 A * | 3/1998 | Bland et al. | ............... | 709/224 |
| 5,734,597 A | 3/1998 | Molnar et al. | ........ | 364/705.08 |
| 5,778,356 A * | 7/1998 | Heiny | .................. | 707/2 |
| 5,812,964 A | 9/1998 | Finger | ................ | 704/7 |
| 5,835,768 A | 11/1998 | Miller et al. | ............ | 395/682 |
| 5,900,871 A | 5/1999 | Atkin et al. | ............. | 345/334 |
| 5,907,326 A | 5/1999 | Atkin et al. | ............. | 345/334 |
| 6,026,440 A | 2/2000 | Shrader et al. | ........... | 709/24 |
| 6,073,090 A | 6/2000 | Fortune et al. | ............ | 704/8 |
| 6,141,010 A * | 10/2000 | Hoyle | ................ | 715/854 |
| 6,147,693 A | 11/2000 | Yunker | ............... | 345/473 |
| 6,167,441 A * | 12/2000 | Himmel | ............. | 709/217 |
| 6,321,348 B1 * | 11/2001 | Kobata | ............... | 714/37 |
| 6,324,511 B1 * | 11/2001 | Kiraly et al. | ........... | 704/260 |
| 6,339,755 B1 | 1/2002 | Hetherington et al. | ...... | 704/8 |
| 6,412,008 B1 | 6/2002 | Fields et al. | ............. | 709/228 |
| 6,469,713 B2 | 10/2002 | Hetherington et al. | ..... | 345/740 |
| 6,470,378 B1 * | 10/2002 | Tracton et al. | ........... | 709/203 |
| 6,490,547 B1 | 12/2002 | Atkin et al. | ............. | 704/8 |
| 6,492,995 B1 | 12/2002 | Atkin et al. | ............ | 345/703 |

(Continued)

OTHER PUBLICATIONS

C. Freytay and L. Neumann, Resource adaptive WWW access for mobile applications, Computers & Graphics, vol. 23, issue 6, Dec. 1999, pp. 841-848.*

(Continued)

*Primary Examiner*—Doug Hutton
*Assistant Examiner*—James H Blackwell
(74) *Attorney, Agent, or Firm*—Duke W. Yee; Herman Rodriguez; Wayne P. Bailey

(57) ABSTRACT

A method, apparatus, and computer instructions for transmitting accessibility requirements. Content is received from a computer at a data processing system. The content is parsed for a selected indicator. The data processing system is queried to identify accessibility requirements in response to the selected indicator being present. The identified accessibility requirements are sent to the computer. These accessibility requirements are use by the computer to generate content for the data processing system.

10 Claims, 4 Drawing Sheets

U.S. PATENT DOCUMENTS

| | | | |
|---|---|---|---|
| 6,553,410 B2* | 4/2003 | Kikinis | 709/218 |
| 6,738,951 B1* | 5/2004 | Weiss et al. | 715/523 |
| 6,757,740 B1* | 6/2004 | Parekh et al. | 709/245 |
| 6,775,687 B1* | 8/2004 | Binding et al. | 709/203 |
| 6,836,799 B1* | 12/2004 | Philyaw et al. | 709/224 |
| 6,862,624 B2* | 3/2005 | Colby et al. | 709/226 |
| 6,976,220 B1* | 12/2005 | Lapstun et al. | 715/753 |
| 6,981,246 B2* | 12/2005 | Dunn | 717/127 |
| 6,981,262 B1* | 12/2005 | DeMello et al. | 719/310 |
| 6,988,240 B2* | 1/2006 | Grober et al. | 715/501.1 |
| 7,000,189 B2* | 2/2006 | Dutta et al. | 715/727 |
| 7,010,587 B1* | 3/2006 | Shiimori | 709/223 |
| 7,069,508 B1* | 6/2006 | Bever et al. | 715/531 |
| 7,181,692 B2* | 2/2007 | Siegel | 715/727 |
| 2002/0016818 A1* | 2/2002 | Kirani et al. | 709/203 |
| 2002/0054097 A1 | 5/2002 | Hetherington et al. | 345/762 |
| 2002/0077805 A1 | 6/2002 | Hecht et al. | |
| 2002/0083100 A1 | 6/2002 | Sakai | |
| 2002/0103914 A1* | 8/2002 | Dutta et al. | 709/229 |
| 2002/0111919 A1 | 8/2002 | Weller et al. | |
| 2002/0120645 A1 | 8/2002 | Adapathya et al. | 707/501.1 |
| 2002/0120721 A1* | 8/2002 | Eilers et al. | 709/220 |
| 2002/0174100 A1 | 11/2002 | Daray et al. | 707/1 |
| 2002/0174421 A1 | 11/2002 | Zhao et al. | 717/174 |
| 2002/0178007 A1* | 11/2002 | Slotznick et al. | 704/270.1 |
| 2002/0184308 A1 | 12/2002 | Levy et al. | 709/203 |
| 2003/0051059 A1* | 3/2003 | Zondervan et al. | 709/250 |
| 2003/0204461 A1* | 10/2003 | Magary et al. | 705/36 |
| 2004/0034521 A1 | 2/2004 | Kawakura et al. | |
| 2004/0087299 A1 | 5/2004 | Vallinen et al. | |
| 2004/0148568 A1* | 7/2004 | Springer | 715/513 |
| 2005/0027709 A1 | 2/2005 | White et al. | |
| 2005/0210102 A1* | 9/2005 | Johnson et al. | 709/204 |
| 2006/0041639 A1* | 2/2006 | Lamkin et al. | 709/219 |
| 2007/0055938 A1* | 3/2007 | Herring et al. | 715/729 |

OTHER PUBLICATIONS

Fielding et al., "Hypertext Transfer Protocol—HTTP/1.1," copyright Jun. 1999, RFC 2616, 114 pages.*

AUS920030446US1, Atkin et al., Method and Apparatus for Transmitting Local Objects.

* cited by examiner

```
<!DOCTYPE HTML PUBLIC "-//W3C//DTD HTML 4.01//EN"
    http://www.w3.org/TR/html4/strict.dtd>
<html>
...
</html>
```

```
<!DOCTYPE HTML PUBLIC "-//W3C//DTD HTML 4.01//EN"
    http://www.w3.org/TR/html4/strict.dtd>
<html>
<object type="Accessibility"></object>
...
</html>
```

```
<?XML version="1.0"?>
<accessibility>
    <keyboard>filter keys
    </keyboard>
    ...
</accessibility>
```

METHOD AND APPARATUS FOR TRANSMITTING ACCESSIBILITY REQUIREMENTS TO A SERVER

CROSS REFERENCE TO RELATED APPLICATIONS

The present invention is related to an application entitled Method and Apparatus for Transmitting Locale Objects, Ser. No. 10/610,240, filed even date hereof, assigned to the same assignee, and incorporated herein by reference.

BACKGROUND OF THE INVENTION

1. Technical Field

The present invention relates generally to an improved data processing system and in particular, to a method and apparatus for processing data. Still more particularly, the present invention relates to a method, apparatus, and computer instructions for transmitting accessibility information from a client to a server.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by the HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java servlets and Enterprise Java Beans (EJB) are Java programs that are run on a server. These programs are generally accessed by clients via a Web browser. Typically, when servlets and EJBs generate or format information, the usability needs of a client user should be honored.

For example, if a user is blind, the user's client computer is typically speech enabled. If the user has a slight vision impairment, the user may configure the operating system to use large fonts or certain types of contrasts to increase the readability of text. Currently, such accessibility information is available only at the operating system level of the client computer.

Currently, a user must be explicitly asked or prompted for accessibility needs before a web server can generate and send content to the user. For example, the user may be presented with a form or pop-up window in which the user may select accessibility options. This information is then transmitted back to the Web server. Such a system, however, requires active user input. Further, in some cases the user may be unable to view the form depending on the particular accessibility requirements. This type of system is burdensome and requires user attention.

As a result, it would be advantageous to have an improved method, apparatus, and computer instructions for transmitting accessibility information from a client to a server for use in providing the appropriate formatting of documents.

SUMMARY OF THE INVENTION

The present invention provides a method, apparatus, and computer instructions for transmitting accessibility requirements. Content is received from a computer at a data processing system. The content is parsed for a selected indicator. The data processing system is queried to identify accessibility requirements in response to the selected indicator being present. The identified accessibility requirements are sent to the computer. These accessibility requirements are used by the computer to generate content for the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
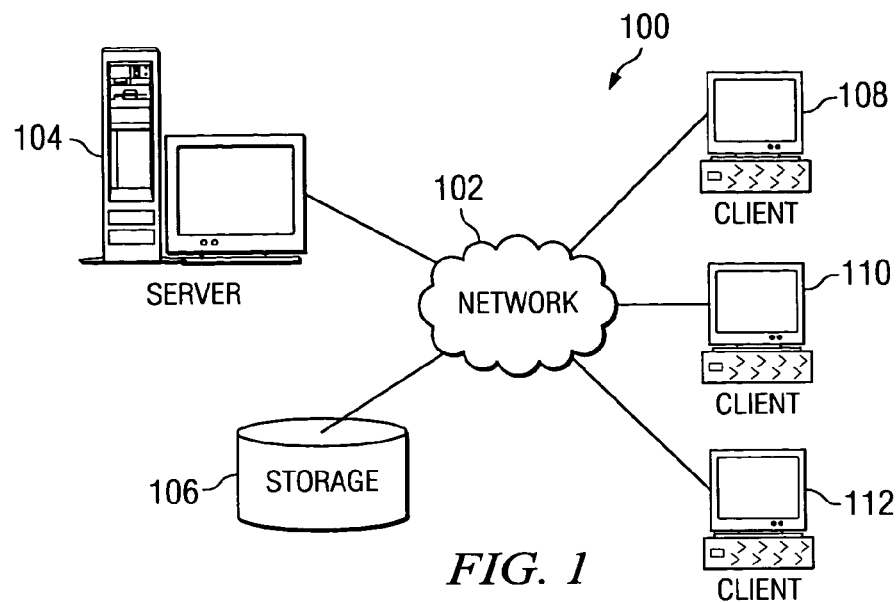
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
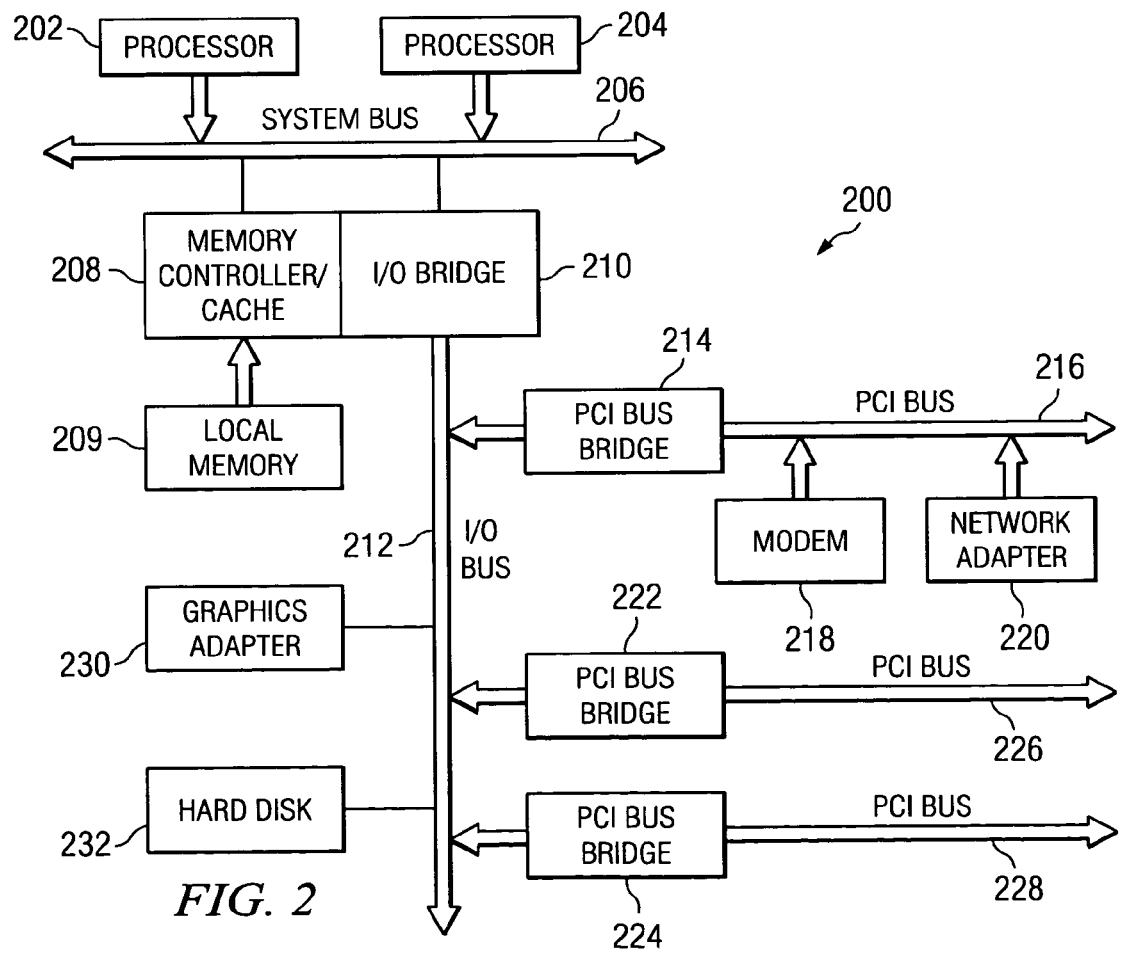
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
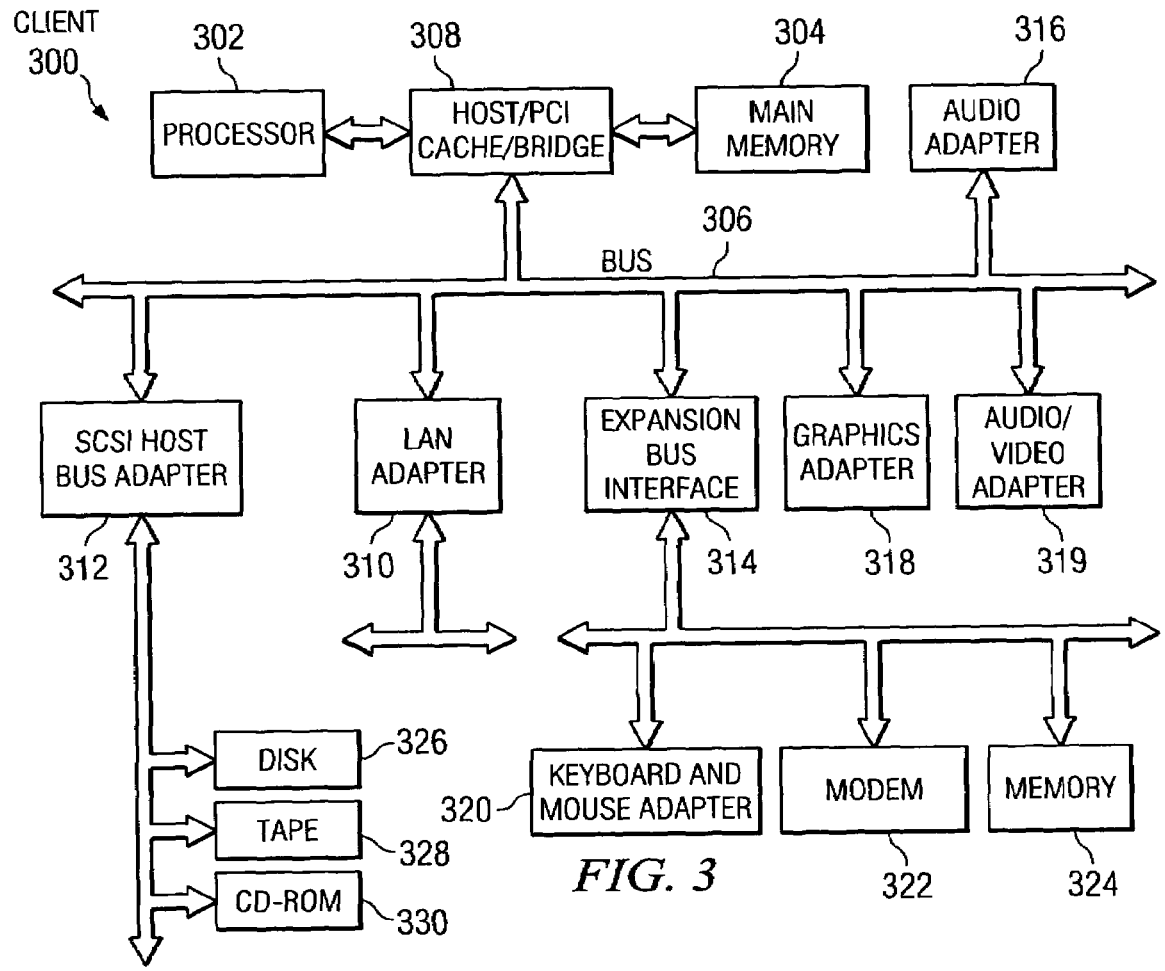
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for transmitting accessibility requirements or information from a client to a server. The mechanism of the present invention employs the use of an application, such as a plug-in that is activated whenever a particular indicator is received in a Web page. In these examples, the indicator takes the form of a multi-purpose Internet mail extension (MIME) object type that is included within the Web page. This indicator causes the application or process to query the client for accessibility information. The accessibility information is obtained by reading accessibility settings present at run-time on the client. Then, this information is sent to the server. In the depicted example, the information is sent to a server in the form of a data object, such as an extensible markup language (XML) document. Further, other types of indicators, such as other types of tags may be used.

Figures 4, 5, 6, 7:
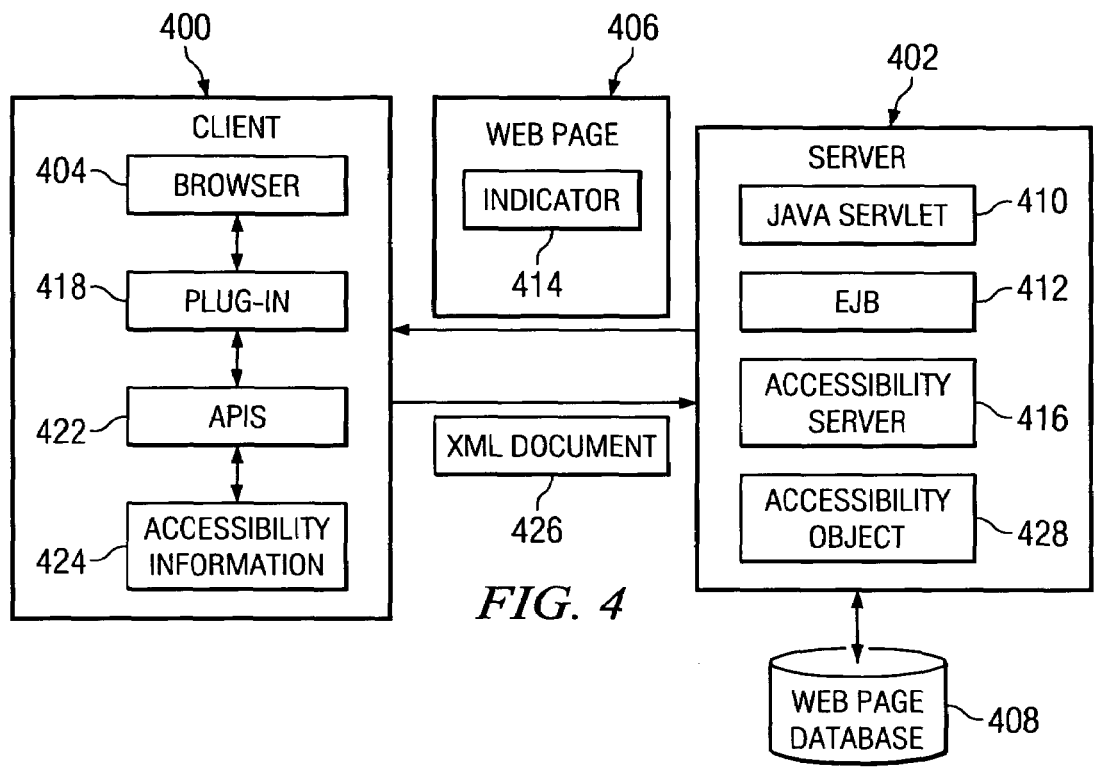
FIG. 4 is a block diagram illustrating components used in transmitting accessibility information in accordance with a preferred embodiment of the present invention.
FIG. 5 is a diagram illustrating Hypertext Markup Language (HTML) content in accordance with a preferred embodiment of the present invention.
FIG. 6 is a diagram illustrating HTML content with an indicator in accordance with a preferred embodiment of the present invention.
FIG. 7 is a diagram illustrating a document containing accessibility information in accordance with a preferred embodiment of the present invention.

Turning next to FIG. 4, a block diagram illustrating components used in transmitting accessibility information is depicted in accordance with a preferred embodiment of the present invention. In this example, client 400 makes a request to server 402 for a Web page through browser 404. Browser 404 may take many forms, such as Microsoft Internet Explorer, which is available from Microsoft Corporation, or Mozilla, which is available from Mozilla.org. In response to this request, server 402 generates Web page 406 from information within Web page database 408.

The generation of Web page 406 may occur through the use of Java servlet 410 or Enterprise Java Bean (EJB) 412. Additionally, Web page 406 may be generated using other mechanisms such as a servlet or server process. As illustrated, indicator 414 is included within Web page 406 by context server 416. In these examples, context server 416 is a server process that is used to include indicator 414 as well as process return accessibility information for use by other server processes. Web page 406 is received by browser 404 at client 400.

Upon receiving Web page 406, browser 404 processes the Web page. The presence of indicator 414 causes plug-in 418 to be activated. As shown, indicator 414 is an object type that takes the form of a multi-purpose Internet mail extension (MIME) type, which is a file identification system based on the MIME encoding system. This MIME type is associated with plug-in 418 and causes plug-in 418 to be activated when the MIME type is detected within Web page 406. In this example, the MIME type is accessibility. This MIME type is used to indicate a particular type of server, such as WebSphere. WebSphere applications are available from International Business Machines Corporation. In addition, the indicator may be located in other types of content other than Web pages. For example, an indicator might be included in a message, a file, or other forms of inter-server process communications.

Plug-in 418 obtains accessibility information, such as the client's font type, font size, whether a speech interface is enabled, enablement of visual warning for generated sounds, and a high contrast display. This information may be obtained by querying the operating system through native calls, such as APIs 422. In response to using APIs 422, accessibility information 424 is obtained from client 400. As illustrated, accessibility information may include information, such as, show sounds, screen reader, and high contrast. Show sounds is used to initiate an application programming interface (API) to provide sounds for users that are hearing impaired. Screen reader is an accessibility feature that provides a text-to-voice translation of text displayed on the screen. High contrast is an accessibility feature used to increase the font size on the display.

With this accessibility information, plug-in 418 returns this information to server 402 by constructing and sending extensible markup language (XML) document 426. This document contains information describing the font size and font type in this example. XML document 426 is sent to server 402 using a POST command. A POST command is an HTTP command used to send text to a Web server for processing. The POST method is widely implemented in HTML files for sending typed-in forms to the server. In these examples, this command is used to transmit the XML document to accessibility server 416. A post command is used in these examples, but other commands, such as a GET command, also may be employed to send the XML document 426 to accessibility server 416.

When XML document 426 is received by accessibility server 416, accessibility server 416 may create a session object, such as accessibility object 428 for tracking purposes. Accessibility object 428 allows for the accessibility information to be recalled for a particular session with client 400. Currently, this kind of information is not accessible by processes on a server.

With the present invention, such a request for accessibility information returns the accessibility information stored in accessibility object 428. No changes or modifications are required to server processes to obtain this type of accessibility information for client 400. Session objects are described in the Java 2 Enterprise Edition (J2EE) architecture by Sun Microsystems, Inc.

Alternatively, instead of maintaining a session object, accessibility server 416 may generate HTML content containing an indicator, such as indicator 414 to retrieve accessibility information from client 400 each time the information is needed. This type of content generation is performed each time Java servlet 410 or EJB 412 instantiates a default data object for a client, such as client 400.

With reference now to FIG. 5, a diagram illustrating hypertext markup language (HTML) content is depicted in accordance with a preferred embodiment of the present invention. Web page 500 in this example is an HTML document generated by a server process, such as Java servlet 410 or EJB 412 in FIG. 4, using information from Web page database 408 in FIG. 4. This document is processed by a server process, such as accessibility server 416 to include an indicator.

Turning now to FIG. 6, a diagram illustrating hypertext markup language content with an indicator is depicted in accordance with a preferred embodiment of the present invention. As illustrated, Web page 600 is similar to Web page 500 except Web page 600 has been modified to include indicator 602. This indicator takes the form of an object type called "Accessibility" in Web page 600.

With reference now to FIG. 7, a diagram illustrating a document containing accessibility information is depicted in accordance with a preferred embodiment of the present invention. Web page 700 is an example of an XML document, such as XML document 426 in FIG. 4. Web page 700 is generated by a process, such as plug-in 418 in FIG. 4, at a client activated in response to an indicator being present in content received by a browser. This document contains accessibility information defining a font size desired by the user for accessibility purposes. In this example, the font size is a 24 point font.

In this manner, the present invention provides an improved method, apparatus, and computer instructions for automatically obtaining accessibility information from a client without requiring user input. The mechanism of the present invention employs a process, such as a plug-in, at the client. This plug-in identifies accessibility information from the client when an indicator, such as a MIME type, is identified or present in content received from a server. This information is returned to the server in a document, such as an XML document using a POST command. This accessibility information is then used by processes on the server to provide appropriate formatting of information for the client.

Figure 8:
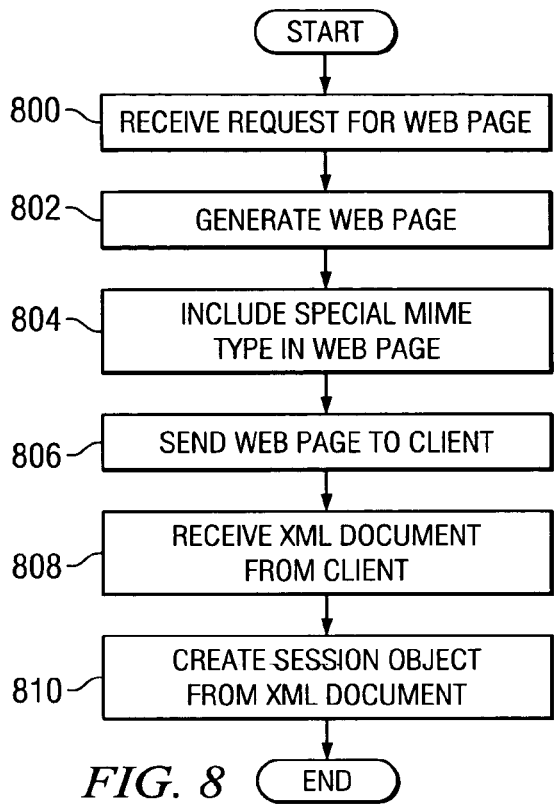
FIG. 8 is a flowchart of a process used for automatically obtaining accessibility information from a client in accordance with a preferred embodiment of the present invention.

With reference now to FIG. 8, a flowchart of a process used for automatically obtaining accessibility information from a client is depicted in accordance with a preferred embodiment of the present invention. The process illustrated in FIG. 8 may be implemented in a server, such as server 402 in FIG. 4.

The process begins by receiving a request for a Web page (step 800). This request is received from a browser at a client, such as browser 404 in FIG. 4. The Web page is generated (step 802). A special MIME is included in the Web page (step 804). This special MIME type is associated with a plug-in that gathers accessibility information on the client. This accessibility information includes the settings present at run time on the client in these examples. This indicator is included using a server process, such as accessibility server 416 in FIG. 4. The Web page is then sent to the client (step 806).

In response, an XML document is received from the client (step 808). As described above, this XML document is received from the client using a POST command. A session object is created from the XML document (step 810) with the process terminating thereafter. This session object is maintained during the session with the client in these examples. Alternatively, these steps in FIG. 8 may be repeated each time accessibility information is needed by a server process if the information is not maintained during the session with the client.

Figure 9:
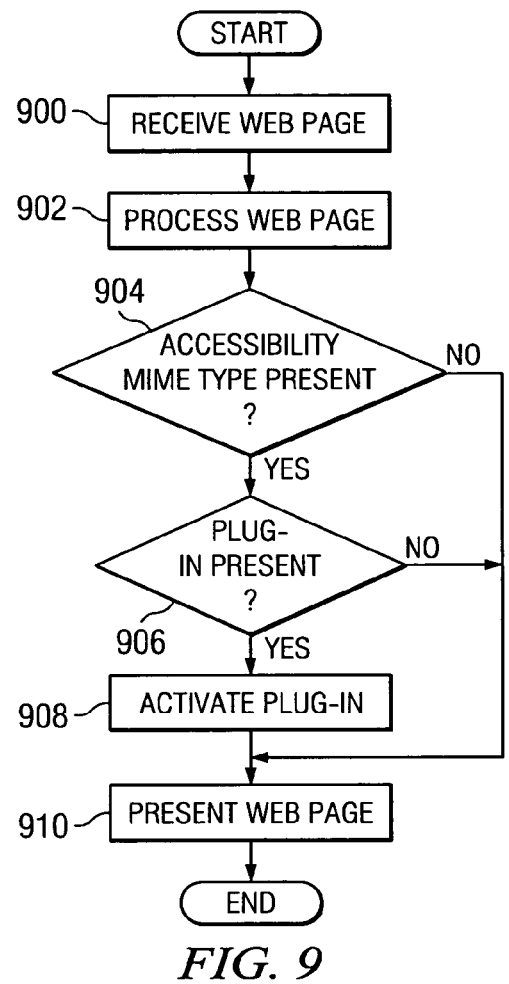
FIG. 9 is a flowchart of a process used for returning accessibility information to a server in accordance with a preferred embodiment of the present invention.

Turning now to FIG. 9, a flowchart of a process used for returning accessibility information to a server is depicted in accordance with a preferred embodiment of the present invention. The process illustrated in FIG. 9 may be implemented in a browser, such as browser 404 in FIG. 4.

The process begins by receiving a Web page (step 900). The web page is processed (step 902). In processing the Web page, the different HTML lines in the Web page are parsed to determine whether an indicator is present. Specifically, a determination is made as to whether an accessibility MIME type is present (step 904). If an accessibility MIME type is present, a determination is made as to whether a plug-in is present (step 906). The determination in step 906 may be made by examining a set of MIME type associations in which different extensions are associated with different plug-ins.

If the plug-in for the accessibility MIME type is present, the plug-in is activated (step 908). The description of the processes performed by the plug-in are described in more detail in FIG. 10 below. The Web page is presented (step 910) and the process terminates thereafter.

With reference again to step 906, if the plug-in is not present, the process proceeds to step 910 as described above. Returning again to step 904, if a accessibility MIME type is absent, the process also proceeds to step 910 as described above.

Figure 10:
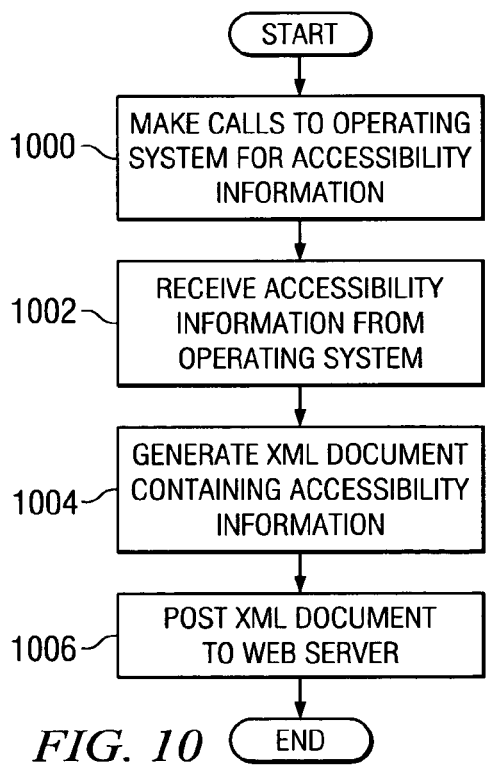
FIG. 10 is a flowchart of a process used for automatically obtaining accessibility information at a client in accordance with a preferred embodiment of the present invention.

With reference now to FIG. 10, a flowchart of a process used for automatically obtaining accessibility information at a client is depicted in accordance with a preferred embodiment of the present invention. The process illustrated in FIG. 10 may be implemented in a plug-in, such as plug-in 418 in FIG. 4. This process is automatically initiated when an indicator associated with the process is identified in content received from a server.

The process begins by making calls to the operating system for accessibility information (step 1000). In these examples, the calls are API calls for the operating system. These types of API calls are commonly available for use in obtaining accessibility information from the operating system environment. For example, these types of calls are described in Microsoft Windows software development kit available from the Microsoft Corporation. In these examples, the accessibility information includes settings present at run-time as maintained by the operating system. As described above, these accessibility settings include, for example, a font type, a font size, enablement of a speech interface, and settings for contrast on a display. The accessibility information is received from the operating system (step 1002).

After the accessibility information is obtained, an XML document containing accessibility information is generated (step 1004). This XML document is posted to the Web server (step 1006) and the process terminates thereafter.

Thus, the present invention provides an improved method, apparatus, and computer instructions for automatically obtaining accessibility information from a client for use by a server process. The mechanism of the present invention includes an indicator, such as a MIME type, in the content sent to a client. This indicator results in a process, such as a browser plug-in, to be activated when the content is received by the client. This plug-in queries the client to identify accessibility information.

The accessibility information is then returned to the server by the plug-in for use in providing formatting of content for the client by server processes. In this manner, accessibility information may be automatically obtained from the client without requiring changes to existing servlets or EJBs to take advantage of this feature. The accessibility information obtained from the client is placed in a location or format for use by the existing servlets or EJBs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrations show a server and client exchange of cultural context information. This process may be applied to other types of communications, such as peer-to-peer communications between computers. In such a case, a computer may take various forms, such as, for example, a PDA, a cell phone, a laptop computer, a desktop computer, a workstation, a kiosk, or a server computer. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transmitting accessibility requirements, comprising:
   requesting a web page from a server;
   receiving the web page from the server;
   parsing content in the web page received from the server for a specified indicator, wherein the specified indicator is an object type that identifies a type of the server;
   responsive to the specified indicator being present, identifying accessibility requirements set for a client in the data processing system;
   generating an extensible markup language (XML) document that contains the identified accessibility requirements; and
   sending the XML document that contains the identified accessibility requirements to the server, wherein the identifying, generating and sending steps are performed by a plug-in to a browser program that is activated by receipt of the selected specified indicator contained in the web page received from the server.

2. The method of claim 1, wherein the identified accessibility requirements include at least one of a font type, a font size, a speech enabled interface, a visual warning for generated sounds, and a high contrast display.

3. The method of claim 1, wherein the specified indicator is identified in the web page by an hypertext markup language (HTML) object type tag contained in the web page that was added to the web page by the server in response to receiving the request for the web page.

4. The method of claim 1, wherein the object type is a multi-purpose internet mail extension (MIME) object type that identifies the type of the server that the web page was received from, and wherein the plug-in is chosen from a plurality of plug-ins based on the MIME object type.

5. The method of claim 4, further comprising:
   receiving additional content from the server in which the additional content is generated by the server using the identified accessibility requirements.

6. The method of claim 4, wherein the accessibility requirements are settings present at runtime for the client in the data processing system and are identified by the plug-in using an operating system application programming interface (API) to obtain accessibility settings from an operating system environment of the client in the data processing system.

7. A method in a data processing system for obtaining accessibility requirements from a client, the method comprising:
   receiving, from the client, a request for a Web page;
   sending the Web page to the client, wherein the Web page includes a specified indicator that causes the client to return accessibility requirements, wherein the specified indicator is an object type that identifies a type of server;
   receiving from the client an extensible markup language (XML) file containing the accessibility requirements of the client;
   responsive to receiving the XML file, creating an accessibility requirements object, wherein the accessibility requirements object contains the accessibility requirements in the XML file; and
   using the accessibility requirements contained in the accessibility requirements object when responding to subsequent requests for Web pages from the client.

8. The method of claim 7, wherein the accessibility requirements object is maintained during a session of the client.

9. The method of claim 7, wherein the server includes at least one of a servlet and an enterprise java bean that is used to respond to the subsequent requests for Web pages.

10. The method of claim 7, wherein the accessibility requirements include at least one of a font type, a font size, a speech enabled interface, a visual warning for generated sounds, and a high contrast display.

* * * * *